US012620336B2

(12) United States Patent
Kim et al.

(10) Patent No.: US 12,620,336 B2
(45) Date of Patent: May 5, 2026

(54) GAMMA VOLTAGE GENERATION CIRCUIT AND DISPLAY DEVICE INCLUDING THE SAME

(71) Applicant: LG Display Co., Ltd., Seoul (KR)

(72) Inventors: Hyun Woo Kim, Paju-si (KR); Beom Jin Kim, Paju-si (KR); Hong Ju Lee, Paju-si (KR)

(73) Assignee: LG Display Co., Ltd., Seoul (KR)

(*) Notice: Subject to any disclaimer, the term of this patent is extended or adjusted under 35 U.S.C. 154(b) by 8 days.

(21) Appl. No.: 18/788,629

(22) Filed: Jul. 30, 2024

(65) Prior Publication Data

US 2025/0209952 A1 Jun. 26, 2025

(30) Foreign Application Priority Data

Dec. 22, 2023 (KR) ........................ 10-2023-0189480

(51) Int. Cl.
*G09G 3/20* (2006.01)
*G09G 3/3291* (2016.01)

(52) U.S. Cl.
CPC ......... *G09G 3/2003* (2013.01); *G09G 3/3291* (2013.01); *G09G 2310/027* (2013.01); *G09G 2310/0291* (2013.01); *G09G 2310/0297* (2013.01); *G09G 2320/0276* (2013.01)

(58) Field of Classification Search
CPC ... G09G 2320/0673; G09G 2320/0276; G09G 2320/0233; G09G 2320/0626; G09G 2320/0242; G09G 2320/0247; G09G 3/3696; G09G 3/20; G09G 3/3688; G09G 3/3275; G09G 3/36; G09G 3/3208; G09G 3/3291; G09G 3/3648; G09G 3/3225; G09G 3/3685; G09G 3/3233; G09G 3/2092; G09G 3/3258; G09G 3/3607; G09G 3/3266; G09G 3/2007; G09G 3/32; G09G 3/2003; G09G 2310/027; G09G 2310/0291; G09G 2310/08; G09G 2310/0297; G09G 2330/028; G09G 2330/021; G09G 2360/16; G09G 2300/0426; G09G 5/10
See application file for complete search history.

(56) References Cited

U.S. PATENT DOCUMENTS

2017/0076656 A1* 3/2017 Bang .................... G09G 3/2092
2020/0312215 A1* 10/2020 You ...................... G09G 3/2003

FOREIGN PATENT DOCUMENTS

KR 10-2010-0006035 A 1/2010
KR 10-2019-0059625 A 5/2019

* cited by examiner

*Primary Examiner* — Dong Hui Liang
(74) *Attorney, Agent, or Firm* — Seed Intellectual Property Law Group LLP

(57) ABSTRACT

A gamma voltage generating circuit includes a plurality of tap nodes, a plurality of resistor strings connected between two tap nodes of the plurality of tap nodes, and a plurality of gamma buffers configured to generate a plurality of tap gamma voltages to output to the plurality of tap nodes, based on voltage division results of the plurality of resistor strings, wherein each of the plurality of resistor strings includes a first connection portion coupled to a tap gamma output of a first gray level and a second connection portion coupled to a tap gamma output of a second gray level which is lower than the first gray level, and the second connection portions of the plurality of resistor strings are distributed and connected to output terminals of two or more gamma buffers.

14 Claims, 16 Drawing Sheets

10

GAMMA VOLTAGE GENERATION CIRCUIT AND DISPLAY DEVICE INCLUDING THE SAME

CROSS-REFERENCE TO RELATED APPLICATIONS

This application claims the benefit of the Korean Patent Application No. 10-2023-0189480 filed on Dec. 22, 2023, which is hereby incorporated by reference as if fully set forth herein.

BACKGROUND

Technical Field

The present disclosure relates to a gamma voltage generating circuit and a display apparatus including the same.

Description of the Related Art

Display apparatuses supply data voltages to pixels having different sizes for each gray level, so as to display an input image. The data voltages are output by digital-to-analog converters, based on gamma compensation voltages generated by a gamma voltage generating circuit.

In display apparatuses having a high resolution and a high frequency, because a time margin of a gamma output is small, a time for which the gamma output is settled to a target voltage should be short. To this end, a time for which the gamma output is unsettled in a transient state should be reduced, namely, an output response time of a gamma voltage generating circuit should be fast.

A method of decreasing an internal load resistance level of the gamma voltage generating circuit may be considered for improving the output response time of the gamma voltage generating circuit, but there may be a problem where a specific gamma buffer is abnormally driven due to an overcurrent. For this reason, because it is difficult to decrease a load resistance level, the use of a large-capacity gamma buffer having good driving capability is needed. However, a gamma buffer having a large size causes an increase in circuit size of the gamma voltage generating circuit.

BRIEF SUMMARY

To overcome the aforementioned problem of the related art, the present disclosure may provide a gamma voltage generating circuit and a display apparatus including the same, which may implement a fast response time with no problem of an abnormal operation caused by an overcurrent even without an increase in size of a gamma buffer.

To achieve these objects and other advantages and in accordance with the purpose of the disclosure, as embodied and broadly described herein, a gamma voltage generating circuit includes a plurality of tap nodes, a plurality of resistor strings connected between two tap nodes of the plurality of tap nodes, and a plurality of gamma buffers configured to generate a plurality of tap gamma voltages to output to the plurality of tap nodes, based on voltage division results of the plurality of resistor strings, wherein each of the plurality of resistor strings includes a first connection portion coupled to a tap gamma output of a first gray level and a second connection portion coupled to a tap gamma output of a second gray level which is lower than the first gray level, and the second connection portions of the plurality of resistor strings are distributed and connected to output terminals of two or more gamma buffers.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
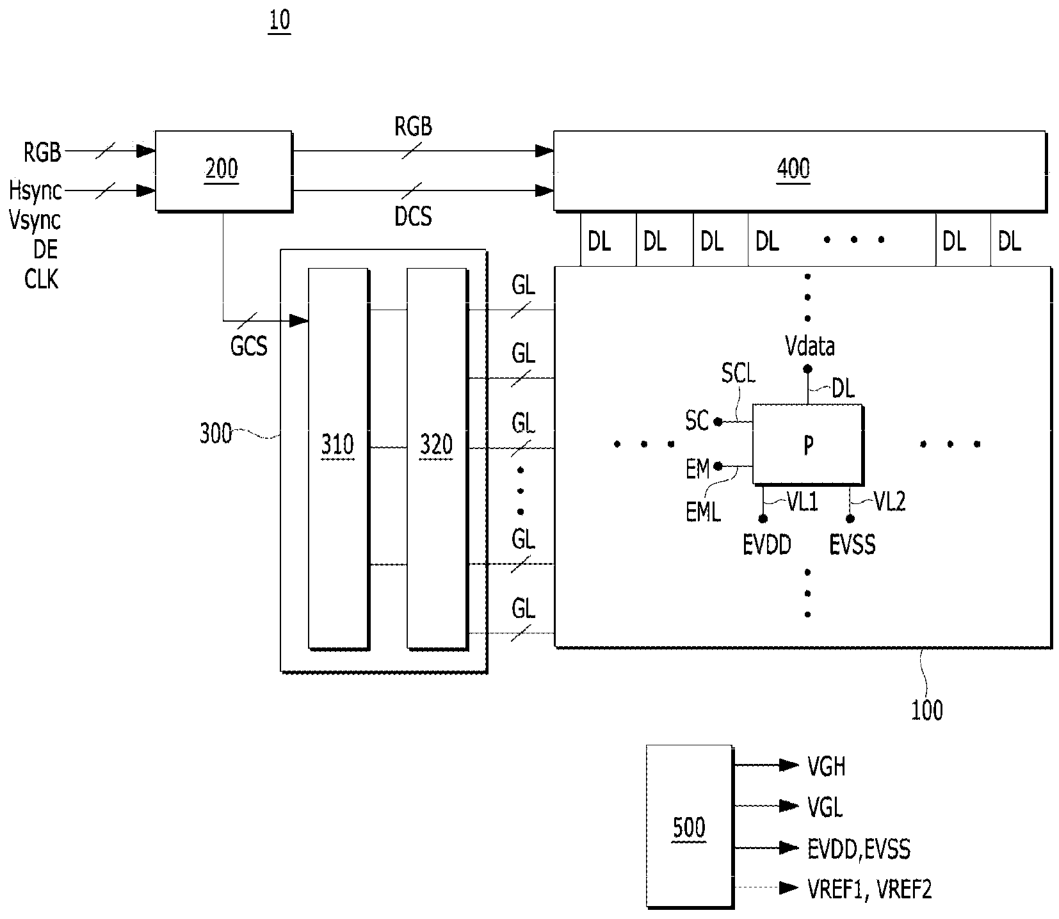
FIG. 1 is a diagram illustrating a display apparatus according to the present embodiment.

Hereinafter, exemplary embodiments of the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

FIG. 1 is a diagram illustrating a display apparatus 10 according to the present embodiment.

Referring to FIG. 1, the display apparatus 10 may include a display panel 100 which includes a plurality of pixels P, a controller 200, a gate driving circuit 300 which supplies a gate signal to each of the plurality of pixels P, a data driving circuit 400 which supplies a data signal (or a data voltage) to each of the plurality of pixels P, and a power circuit 500 which supplies power needed for driving. The gate driving circuit 300 and the data driving circuit 400 may be included in a display panel driving circuit.

The display panel 100 may include a display area where the pixels P are provided and a non-display area where the gate driving circuit 300 and the data driving circuit 400 are provided.

In the display panel 100, a plurality of gate lines GL and a plurality of data lines DL may intersect with one another, and each of the plurality of pixels P may be connected to a gate line GL and a data line DL. In detail, one pixel P may be supplied with a gate signal from the gate driving circuit 300 through the gate line GL, may be supplied with a data signal from the data driving circuit 400 through the data line DL, and may be supplied with a high level driving voltage EVDD and a low level driving voltage EVSS from the power circuit 500.

The gate line GL may transfer a scan signal SC and an emission control signal EM to the plurality of pixels P, and the data line DL may transfer a data voltage Vdata to the plurality of pixels P. According to various embodiments, the gate line GL may include a plurality of scan lines SCL for supplying the scan signal SC and a plurality of emission control signal lines EML for supplying the emission control signal EM. The plurality of pixels P may be supplied with the high level driving voltage EVDD through a first power line VL1 and may be supplied with the low level driving voltage EVSS through a second power line VL2.

Each of the pixels P may include a light emitting device and a pixel circuit which controls driving of the light emitting device. The light emitting device may include an anode electrode, a cathode electrode, and an emission layer between the anode electrode and the cathode electrode.

The pixel circuit may include a plurality of switching elements, a driving element, and a capacitor. The switching element and the driving element may each be configured as a thin film transistor (TFT). The driving element may control the amount of current supplied to the light emitting device to adjust the amount of light emission of the light emitting device, based on a data voltage Vdata. The plurality of switching elements may be turned on based on the scan signal SC supplied through the plurality of scan lines SCL and the emission control signal EM supplied through the emission control line EML.

The display panel 100 may be implemented as a non-transmissive display panel or a transmissive display panel. The transmissive display panel may be applied to a transparent display apparatus where an image is displayed on a screen and a real thing of a background is seen. The display panel 100 may be implemented as a flexible display panel. The flexible display panel may be implemented as an organic light emitting diode (OLED) panel including a plastic substrate.

Each of the pixels P may be divided into a red pixel, a green pixel, and a blue pixel so as to implement colors. Each pixel P may further include a white pixel.

Touch sensors may be disposed on the display panel 100. A touch input may be sensed by using separate touch sensors, or may be sensed through the pixels P. The touch sensors may be arranged as an on-cell or add-on type on a screen of the display panel 100, or may be implemented as in-cell type touch sensors embedded in the display panel 100.

The controller 200 may process image data RGB input from a host system (not shown) to supply to the data driving circuit 400, based on a size and a resolution of the display panel 100. The controller 200 may generate a gate control signal GCS and a data control signal DCS by using synchronization signals (for example, a dot clock signal CLK, a data enable signal DE, a horizontal synchronization signal Hsync, and a vertical synchronization signal Vsync) input from the host system. The controller 200 may supply the gate control signal GCS to the gate driving circuit 300 to control an operation timing of the gate driving circuit 300. The controller 200 may supply the data control signal DCS to the data driving circuit 400 to control an operation timing of the data driving circuit 400. The controller 200 may synchronize the operation timing of the gate driving circuit 300 with the operation timing of the data driving circuit 400 by using the gate control signal GCS and the data control signal DCS.

The host system be one of a television (TV) system, a set-top box, a navigation system, a personal computer (PC), a home theater system, a mobile device, a wearable device, and an automotive display system.

The controller 200 may be configured with various processors (for example, a microprocessor, a mobile processor, an application processor, and a combination thereof), based on a device mounted thereon.

The controller 200 may drive the pixel P at various refresh rates. The controller 200 may drive the pixel P in a variable refresh rate (VRR) mode. In other words, the controller 200 may changeably drive the pixel P at a refresh rate between a first refresh rate and a second refresh rate. The controller 200 may simply change a speed of a clock signal, or may generate a synchronization signal so that a horizontal blank or a vertical blank occurs, or may drive the gate driver 300 in a mask type, thereby driving the pixel P at various refresh rates.

A logic voltage level of the gate control signal GCS output from the controller 200 may be level-shifted to a gate low voltage VGL and a gate high voltage VGH by using a level shifter (not shown) and may then be supplied to the gate driving circuit 300. The level shifter may shift a low logic level voltage of the gate control signal GCS to a gate low voltage VGL level and may shift a high logic level voltage of the gate control signal GCS to a gate high voltage VGH level. The gate control signal GCS may include a start pulse and a shift clock.

The gate driving circuit 300 may supply the gate signal to the gate line GL, based on the gate control signal GCS supplied from the controller 200. The gate driving circuit 300 may be disposed at one side or both sides of the display panel 100 in a gate in panel (GIP) type.

The gate driving circuit 300 may sequentially output the gate signal to the plurality of gate lines GL, based on control by the controller 200. The gate driving circuit 300 may shift the gate signal by using shift register to sequentially supply corresponding signals to the gate lines GL.

In an organic light emitting display apparatus, the gate signal may include the scan signal SC and the emission control signal EM. The scan signal SC may include a scan pulse which swings between the gate low voltage VGL and the gate high voltage VGH. The emission control signal EM may include an emission control signal pulse which swings between the gate low voltage VGL and the gate high voltage VGH. The scan signal SC may select pixels P of a line in which data voltages Vdata are to be written. The emission control signal EM may define an emission time of each pixel P.

The gate driving circuit 300 may include an emission control signal driving circuit 310 and one or more scan driving circuits 320.

The emission control signal driving circuit 310 may output an emission control signal pulse in response to the start pulse and the shift clock from the controller 200 and may sequentially shift the emission control signal pulse, based on the shift clock.

The one or more scan driving circuits 320 may output the scan pulse in response to the start pulse and the shift clock from the controller 200 and may shift the scan pulse, based on a shift clock timing.

The data driving circuit 400 may convert the image data RGB into a data voltage Vdata and may supply the data voltage Vdata to the pixel P through the data line DL, based on the data control signal DCS supplied from the controller 200. The data driving circuit 400 may include a gamma voltage generating circuit which is supplied with a first reference voltage VREF1 and a second reference voltage VREF2 to output gamma compensation voltages.

In FIG. 1, it is illustrated that the data driving circuit 400 is disposed at one side of the display panel 100, but the number and arrangement positions of data driving circuits 400 are not limited thereto. That is, the data driver circuit 400 may be configured as a plurality of integrated circuits (ICs) and may be provided in plurality and disposed at one side of the display panel 100.

The power circuit 500 may generate a direct current (DC) power needed for driving of the display panel driving circuit and a pixel array of the display panel 100 by using a DC-DC converter. The DC-DC converter may include a charge pump, a regulator, a buck converter, and a boost converter. The power circuit 500 may receive a DC input voltage applied from the host system (not shown) to generate DC voltages such as the gate low voltage VGL, the gate high voltage VGH, the high level driving voltage EVDD, the low level driving voltage EVSS, and the first and second reference voltages VREF1 and VREF2. The gate low voltage VGL and the gate high voltage VGH may be supplied to the level shifter (not shown) and the gate driving circuit 300. The high level driving voltage EVDD and the low level driving voltage EVSS may be supplied to the pixels P in common. The first and second reference voltages VREF1 and VREF2 may be supplied to the data driving circuit 400.

Figure 2:
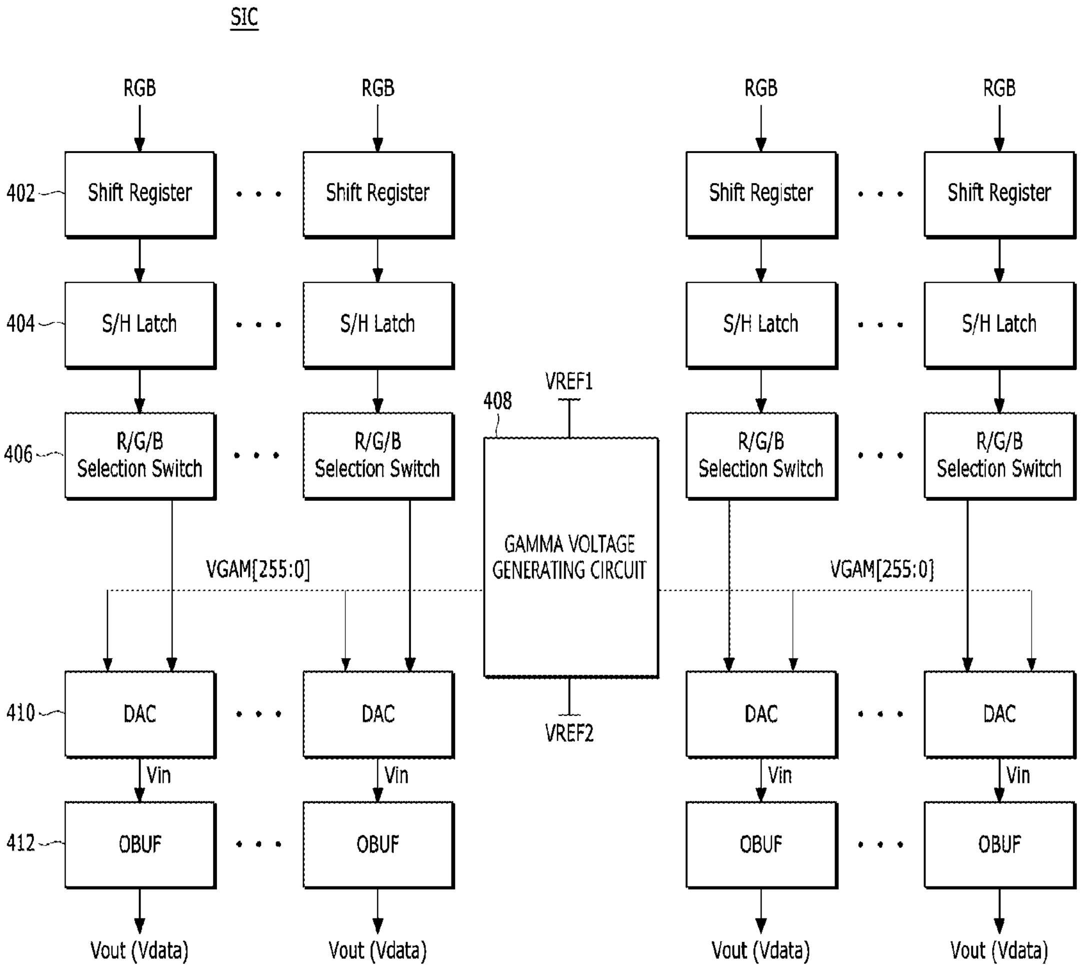
FIG. 2 is a diagram illustrating a data driving circuit of a display apparatus according to the present embodiment.
Figure 3:
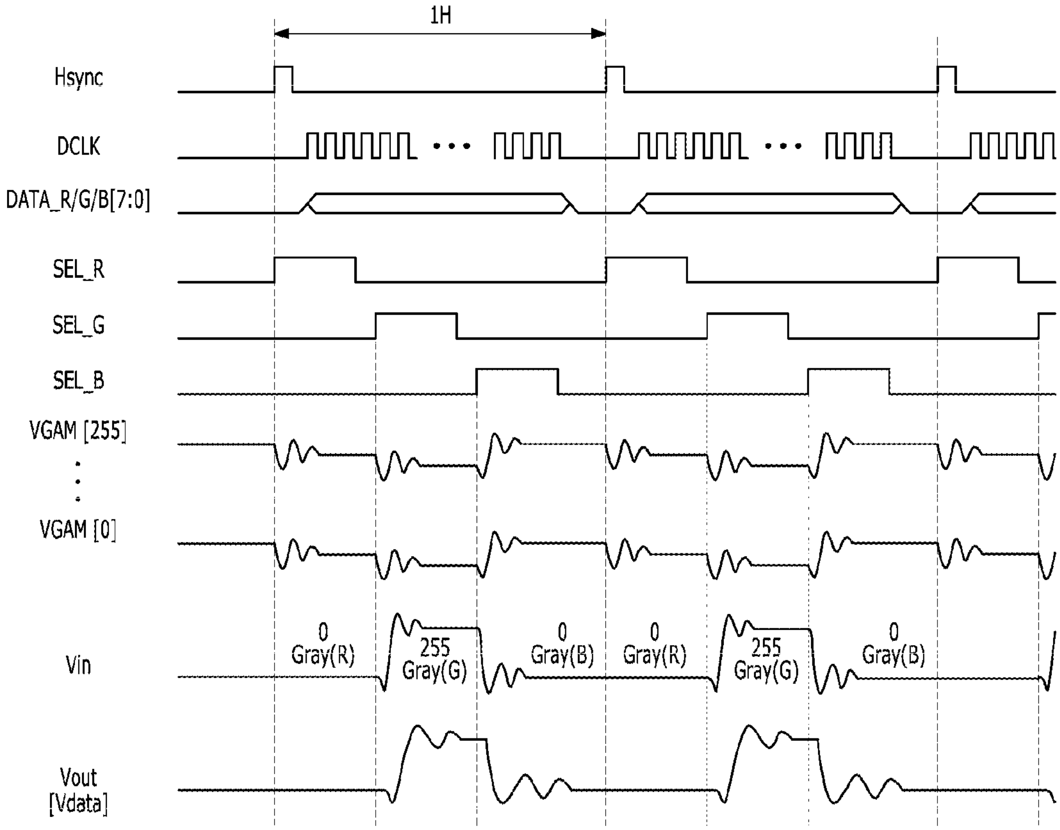
FIG. 3 is a diagram showing an operation timing of the data driving circuit of FIG. 2.

FIG. 2 is a diagram illustrating a data driving circuit of a display apparatus according to the present embodiment. FIG. 3 is a diagram showing an operation timing of the data driving circuit of FIG. 2.

Referring to FIG. 2, the data driving circuit 400 of the display apparatus 100 may include a plurality of source ICs SIC. Each of the source ICs SIC may include a shift register unit 402, a latch unit 404, an R/G/B switching unit 406, a gamma voltage generating circuit 408, a digital-to-analog converter (DAC) 410, and an output buffer unit (OBUF) 412.

The shift register unit 402 may convert digital image data RGB, received from a controller (200 of FIG. 1), into parallel data to supply to the latch unit 404. The shift register unit 402 may shift a source start pulse SSP according to a source sampling clock SSC to sequentially generate a sampling clock.

The latch unit 404 may sample the digital image data RGB with respect to the sampling clock sequentially input from the shift register unit 402 and may output pieces of latched data simultaneously with latch units of other source ICs in response to a low logic voltage of a source output enable signal SOE.

The R/G/B switching unit 406 may perform switching of image data RGB sampled and latched by the latch unit 404 for each R/G/B to divide data.

The DAC 410 may be supplied with gamma compensation voltages VGAM[255:0] from the gamma voltage generating circuit 408 and may map image data RGB, input from the R/G/B switching unit 406, to the gamma compensation voltages VGAM[255:0] to generate a buffer input voltage Vin and may then output the buffer input voltage Vin to the output buffer unit (OBUF) 412. The buffer input voltage Vin may be substantially the same as an analog data voltage Vdata. When digital image data RGB of 8 bits is supplied, the digital image data RGB may be expressed as 256 pieces of data having gray levels of 0 to 255 G0 to G255. In this case, the DAC 410 may receive 0 to 255 gamma compensation voltages VGAM [0] to VGAM [255] from the gamma voltage generating circuit 408 and may output, as the buffer input voltage Vin, one gamma compensation voltage VGAM corresponding to a data value of the digital image data RGB among the 0 to 255 gamma compensation voltages VGAM [0] to VGAM [255].

The output buffer unit (OBUF) 412 may output a result Vout, obtained by buffering the buffer input voltage Vin through an output buffer, as a data voltage Vdata to data lines in response to a low logic voltage of the source output enable signal SOE.

The gamma voltage generating circuit 408 may sequentially output the 0 to 255 gamma compensation voltages VGAM [0] to VGAM [255] corresponding R, G, and B. The gamma voltage generating circuit 408 may need a time for settling an output voltage to a target level whenever R, G, and B are changed. The gamma voltage generating circuit 408 may be implemented as in FIGS. 8 to 16 so as to decrease an output settling time, namely, to implement a fast response time with no problem of an abnormal operation caused by an overcurrent even without an increase in size of a gamma buffer.

Figure 4:
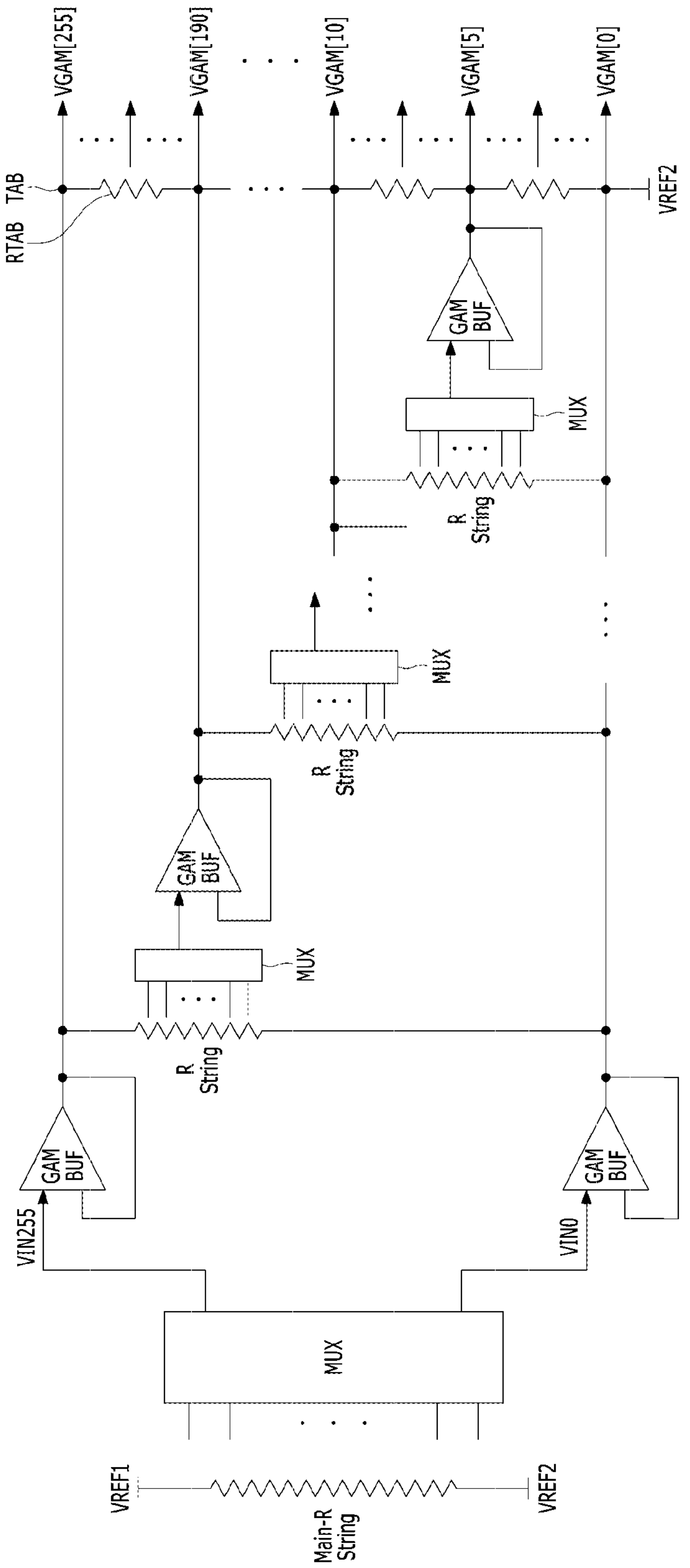
FIG. 4 is a diagram illustrating a gamma voltage generating circuit according to a comparative example.
Figure 5:
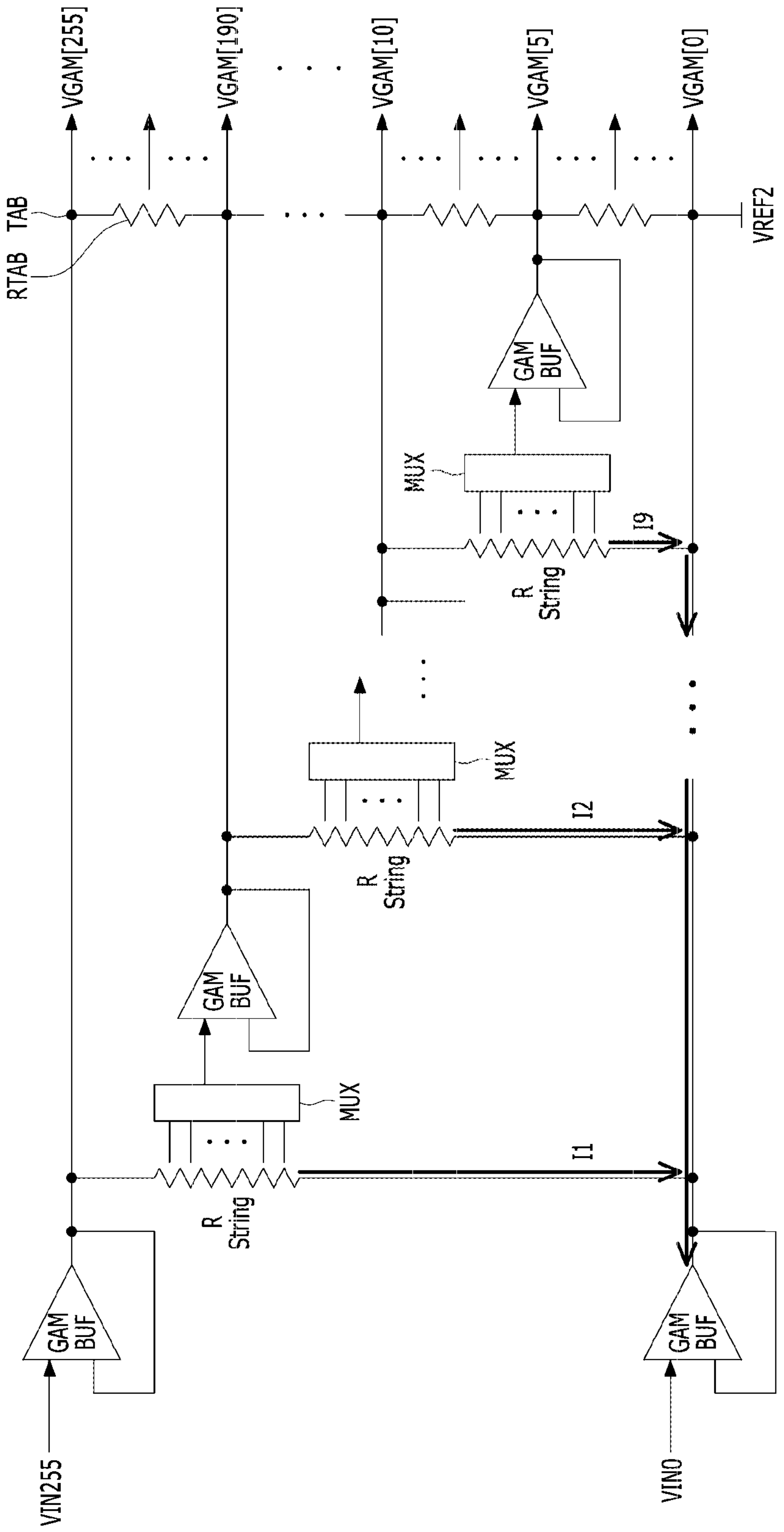
FIG. 5 is a diagram illustrating a flow of an internal current when an internal resistance load is reduced, in the gamma voltage generating circuit according to a comparative example.
Figure 6:
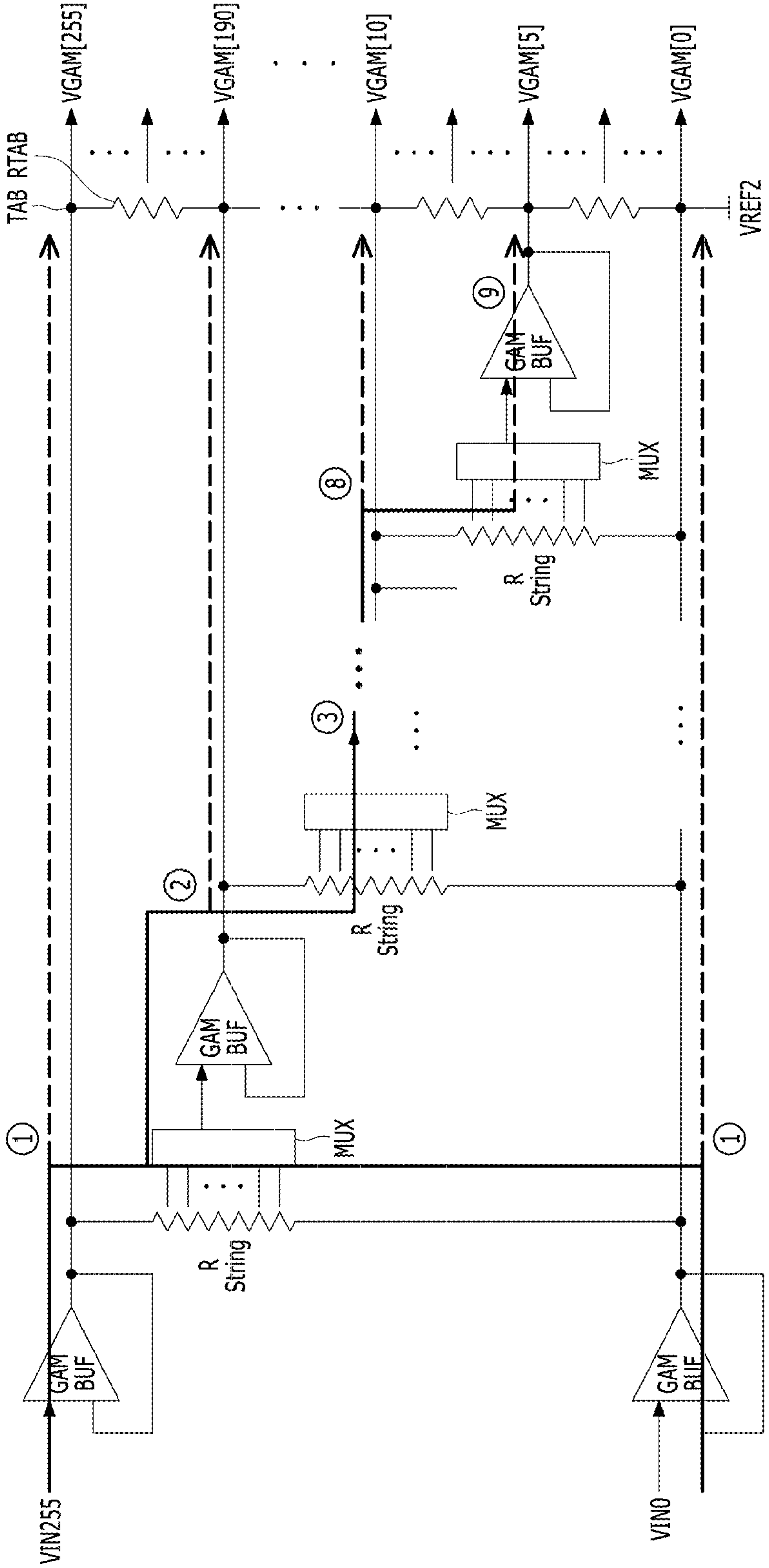
FIGS. 6 and 7 are diagrams showing a gamma voltage determination order and an output settling time based thereon in the gamma voltage generating circuit according to a comparative example.
Figure 7:
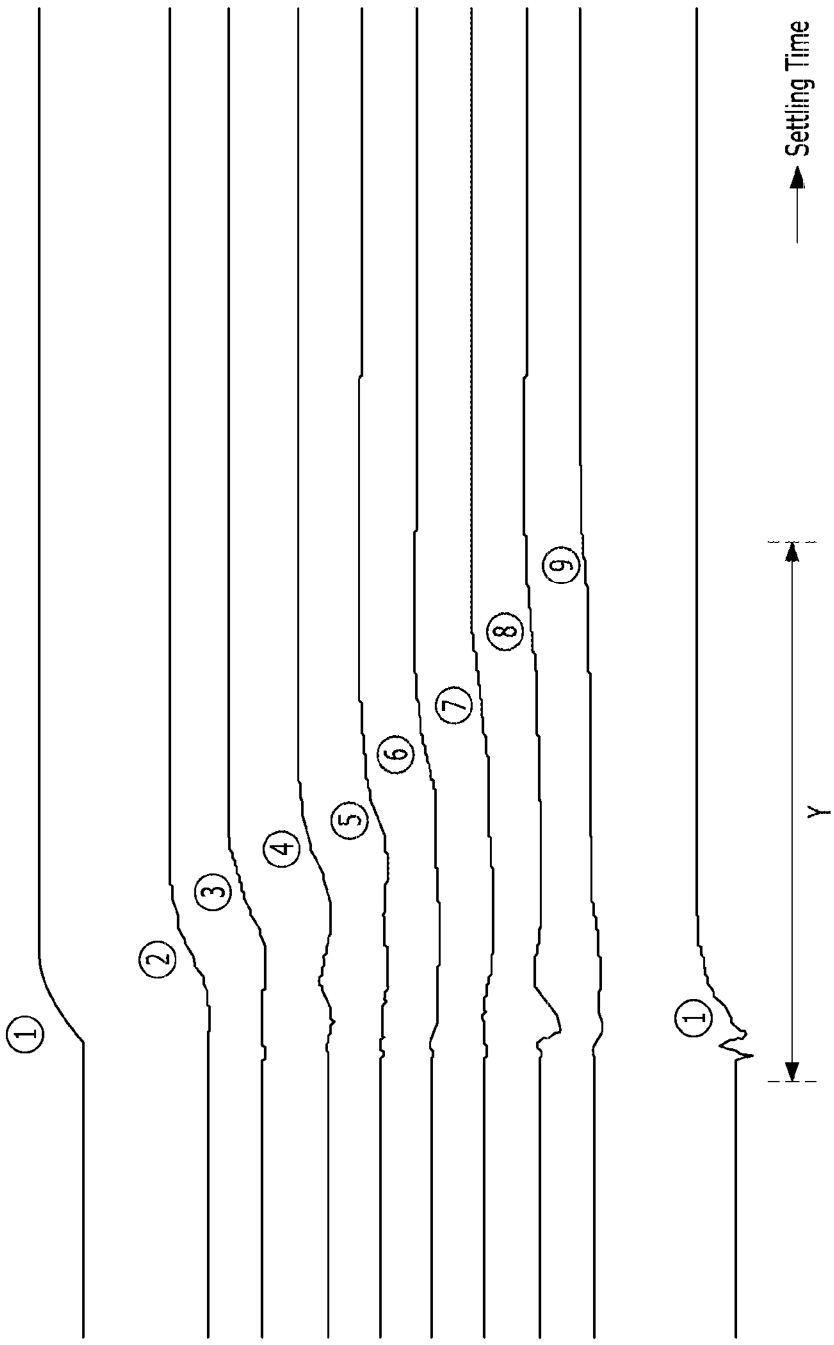

FIG. 4 is a diagram illustrating a gamma voltage generating circuit according to a comparative example. FIG. 5 is a diagram illustrating a flow of an internal current when an internal resistance load is reduced, in the gamma voltage generating circuit according to a comparative example. FIGS. 6 and 7 are diagrams showing a gamma voltage determination order and an output settling time based thereon in the gamma voltage generating circuit according to a comparative example.

0 to 255 gamma compensation voltages VGAM [0] to VGAM [255] output from a gamma voltage generating circuit may vary over time, based on an output order of R, G, and B. The gamma voltage generating circuit, as in FIG. 4, may generate the 0 to 255 gamma compensation voltages VGAM [0] to VGAM [255] determined based on a first input voltage VIN255 and a second input voltage VIN0. Each of the first input voltage VIN255 and the second input voltage VIN0 may be one of voltage division results of a main resistor string Main-R String connected to a first reference voltage VREF1 and a second reference voltage VREF2.

The gamma voltage generating circuit may include a plurality of tap nodes TAB, a plurality of resistor strings R String connected between two tap nodes TAB, multiplexers MUX which selectively output voltage division results of the resistor string, and gamma buffers GAM BUF which buffer multiplexer outputs to apply to the tap nodes TAB.

Some of the 0 to 255 gamma compensation voltages VGAM [0] to VGAM [255] may be a plurality of tap gamma voltages VGAM [0], [5], [10], . . . , [190], and [255]. The number of tap gamma voltages VGAM [0], [5], [10], . . . , [190], and [255] may be 10. A tap gamma voltage may be referred to as a gamma reference voltage. Also, the other gamma compensation voltages except the tap gamma voltages may be voltages obtained through voltage division by a tap resistor RTAB connected between adjacent tap nodes TAB.

The first input voltage VIN255 may be buffered by an uppermost gamma buffer GAM BUF and may then be applied to an uppermost tap node TAB, and thus, may be a tap gamma voltage VGAM [255] having a highest gray level. The second input voltage VIN0 may be buffered by a lowermost gamma buffer GAM BUF and may then be applied to a lowermost tap node TAB, and thus, may be a tap gamma voltage VGAM [0] having a lowest gray level.

When a level of the first input voltage VIN255 and a level of the second input voltage VIN0 are shifted, levels of the 0 to 255 gamma compensation voltages VGAM [0] to VGAM [255] may be shifted.

In a display apparatus having a high resolution and a high frequency, because a time margin of a gamma output is small, a time for which the gamma output is settled to a target voltage should be short. To this end, an output response time of a gamma voltage generating circuit should be fast.

A method of decreasing an internal load resistance level of the gamma voltage generating circuit may be considered for improving the output response time of the gamma voltage generating circuit. FIG. 5 illustrates a flow of an internal current of the gamma voltage generating circuit when an internal resistance load of a resistor string is reduced. When load resistance levels of resistor strings are reduced, levels of currents I1, I2, . . . , and I9 flowing in the resistor strings may increase, the increased currents I1, I2, . . . , and I9 may concentrate on an output terminal of the lowermost gamma buffer GAM BUF. As a result, when a sum of concentrated currents is greater than an available level defined in a gamma buffer, the lowermost gamma buffer GAM BUF may abnormally operate.

Such a reason is because there is a limitation in reducing load resistance levels of gamma strings in the gamma voltage generating circuit having a structure illustrated in FIG. 4, a gamma output settling time may increase. For example, in the gamma voltage generating circuit according to the comparative example, tap gamma voltages may be charged in tap nodes in the order of ①_②_③_. . ._⑧_⑨ as in FIG. 6, and tap gamma voltages may be settled in the same order, based on output variations of R_G_B. As a result, because a charging order of tap gamma voltages in the gamma voltage generating circuit according to the comparative example is sequentially determined in this order from a voltage of an upper end to a voltage of a lower end, there may be a problem where an output settling time Y of the gamma voltage generating circuit increases as in FIG. 7.

To decrease an output settling time of the gamma voltage generating circuit, the use of a large-capacity gamma buffer having good driving capability may be needed. However, there may be a drawback where a circuit size of the gamma voltage generating circuit increases.

Figure 8:
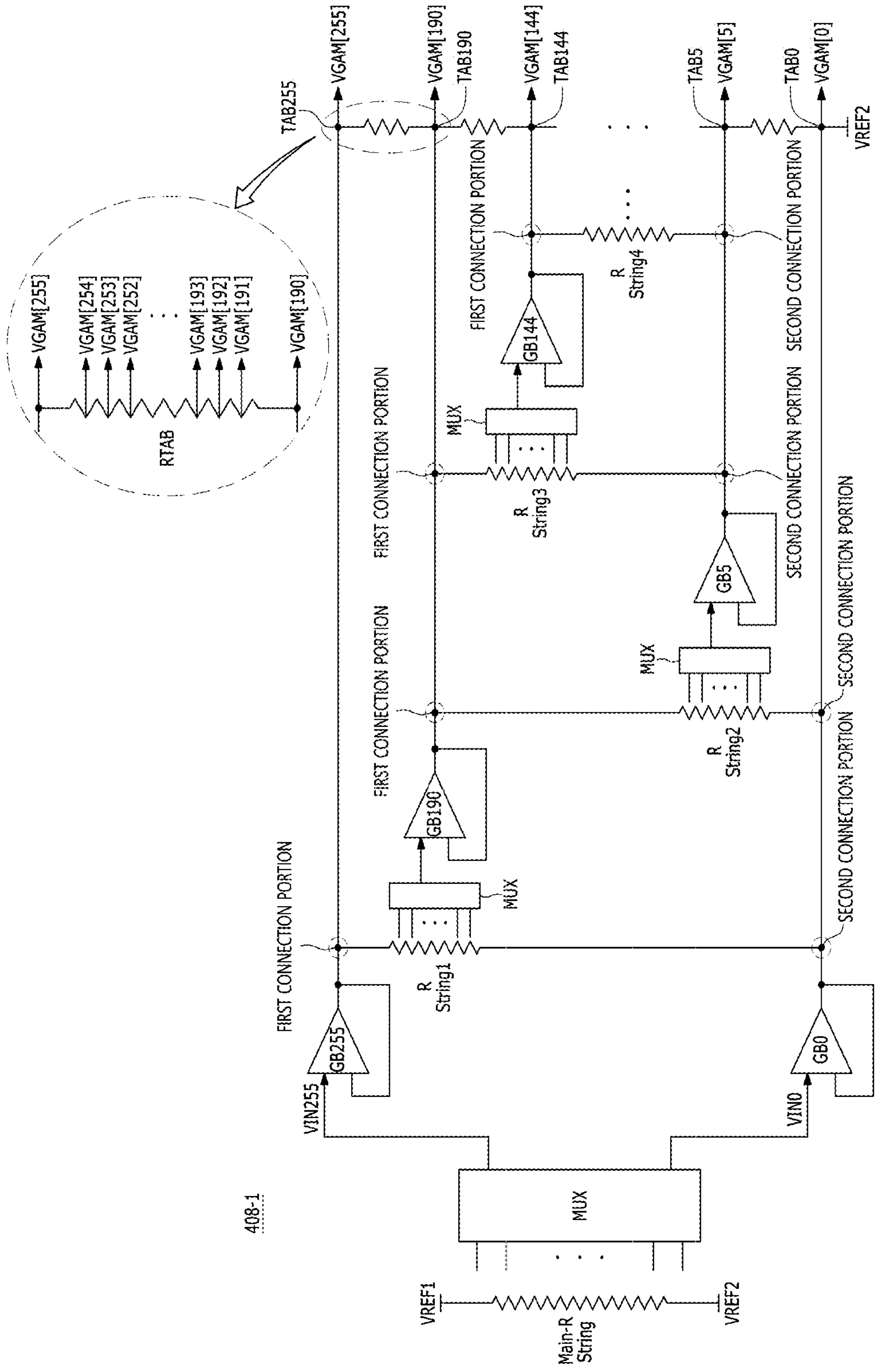
FIGS. 8 and 9 are diagrams illustrating a gamma voltage generating circuit according to a first embodiment.
Figure 9:
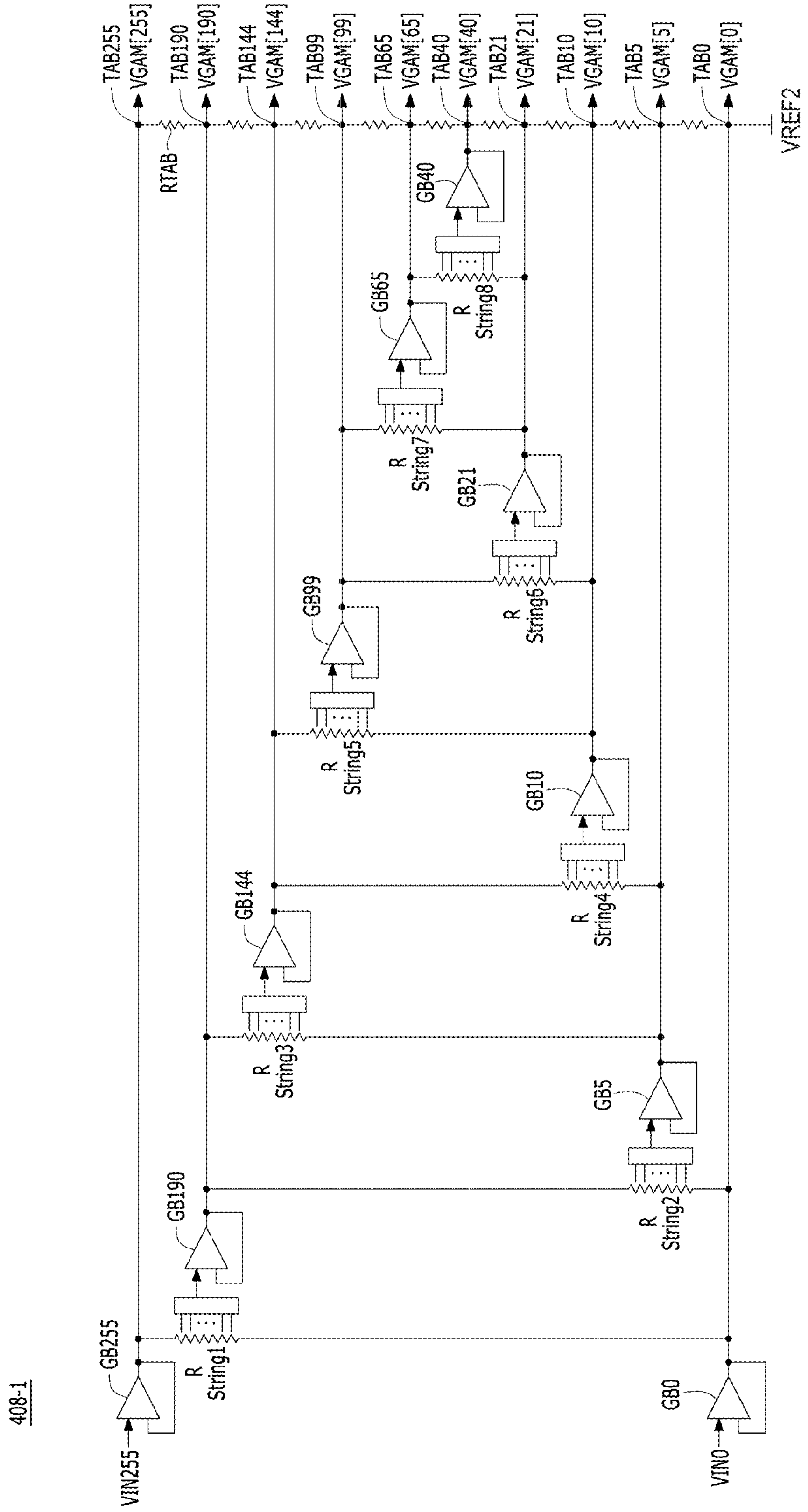
Figure 10:
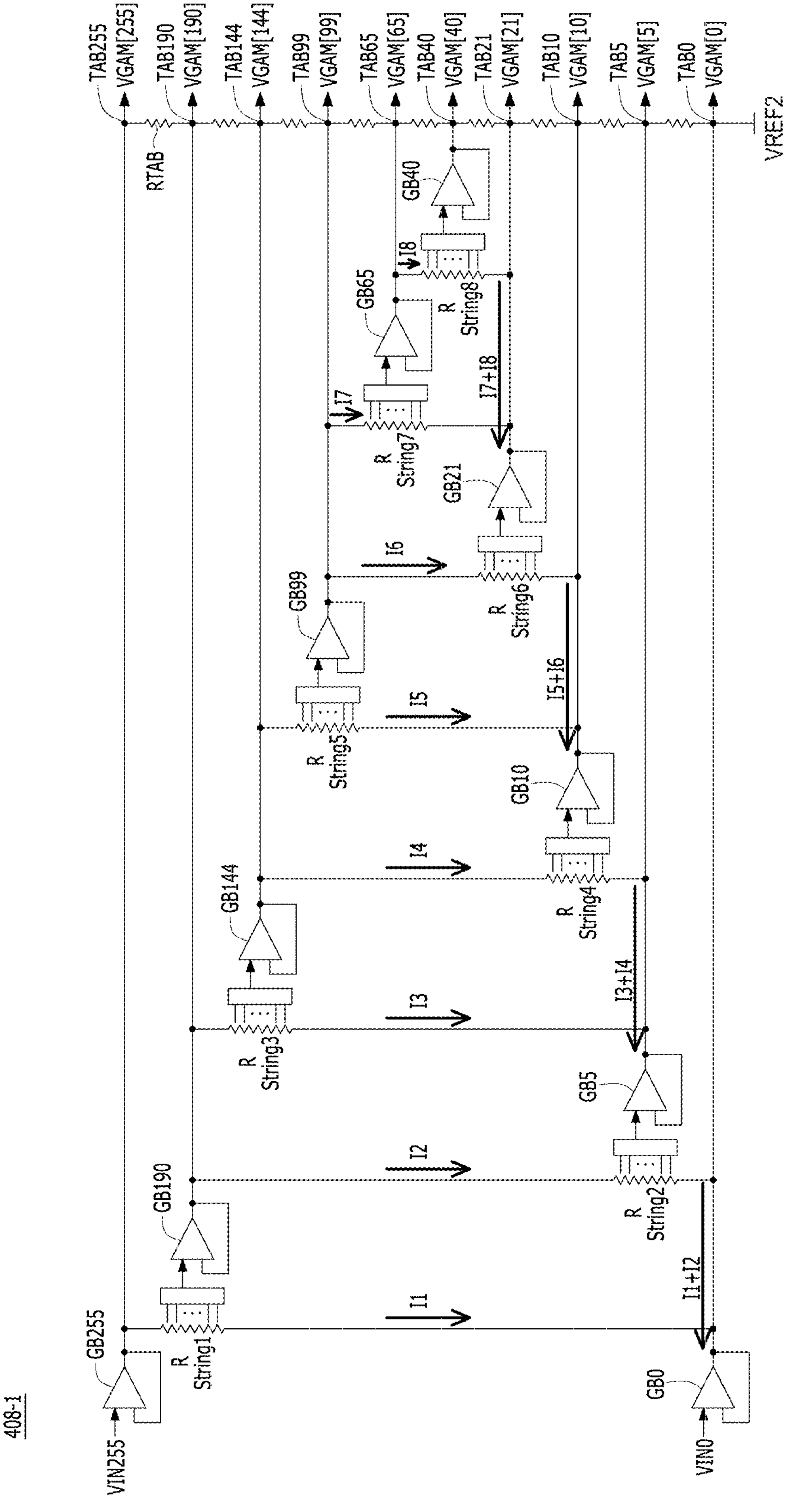
FIG. 10 is a diagram illustrating a flow of an internal current when an internal resistance load is reduced, in the gamma voltage generating circuit according to the first embodiment.
Figure 11:
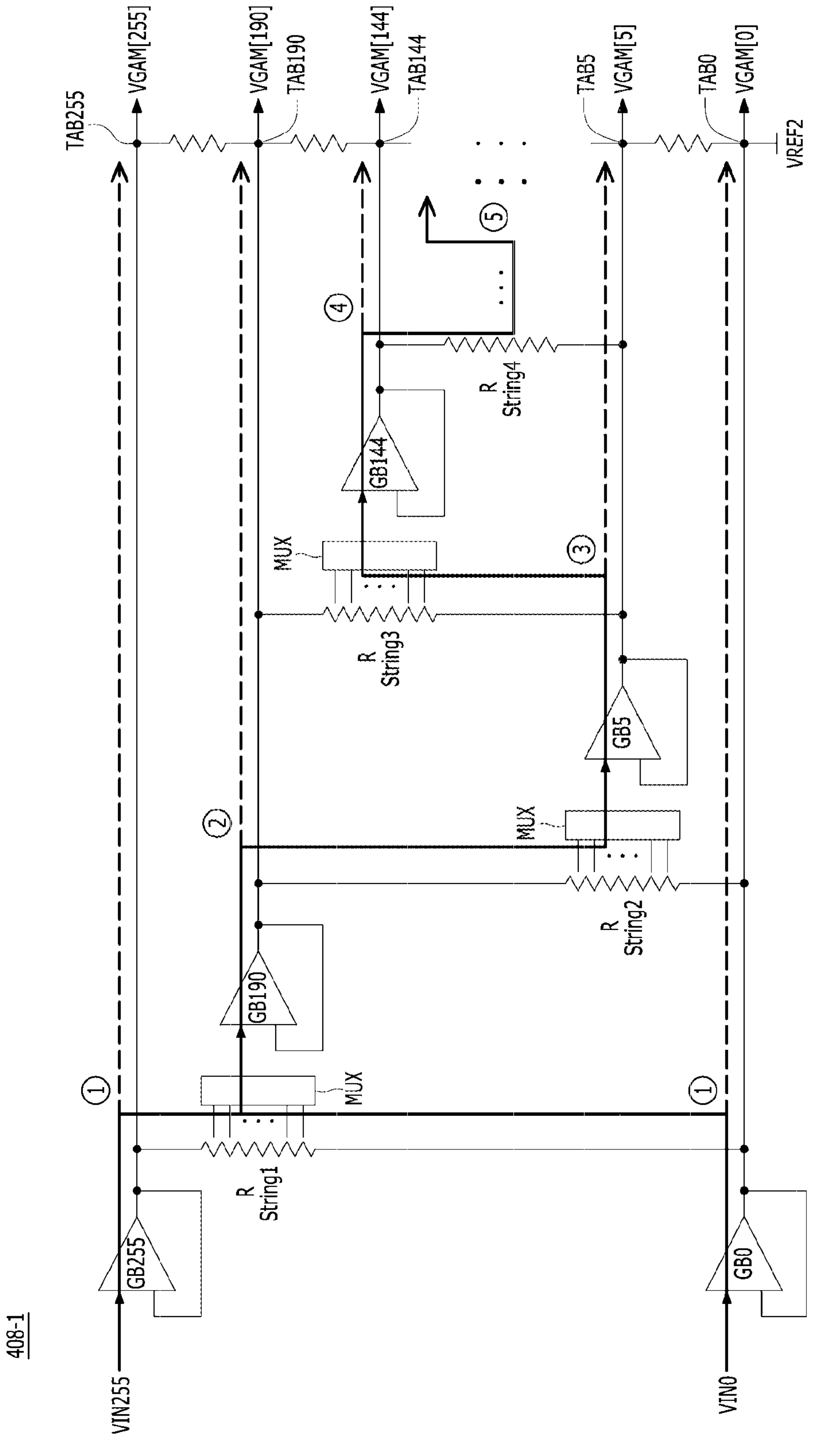
FIGS. 11 and 12 are diagrams showing a gamma voltage determination order and an output settling time based thereon in the gamma voltage generating circuit according to the first embodiment.
Figure 12:
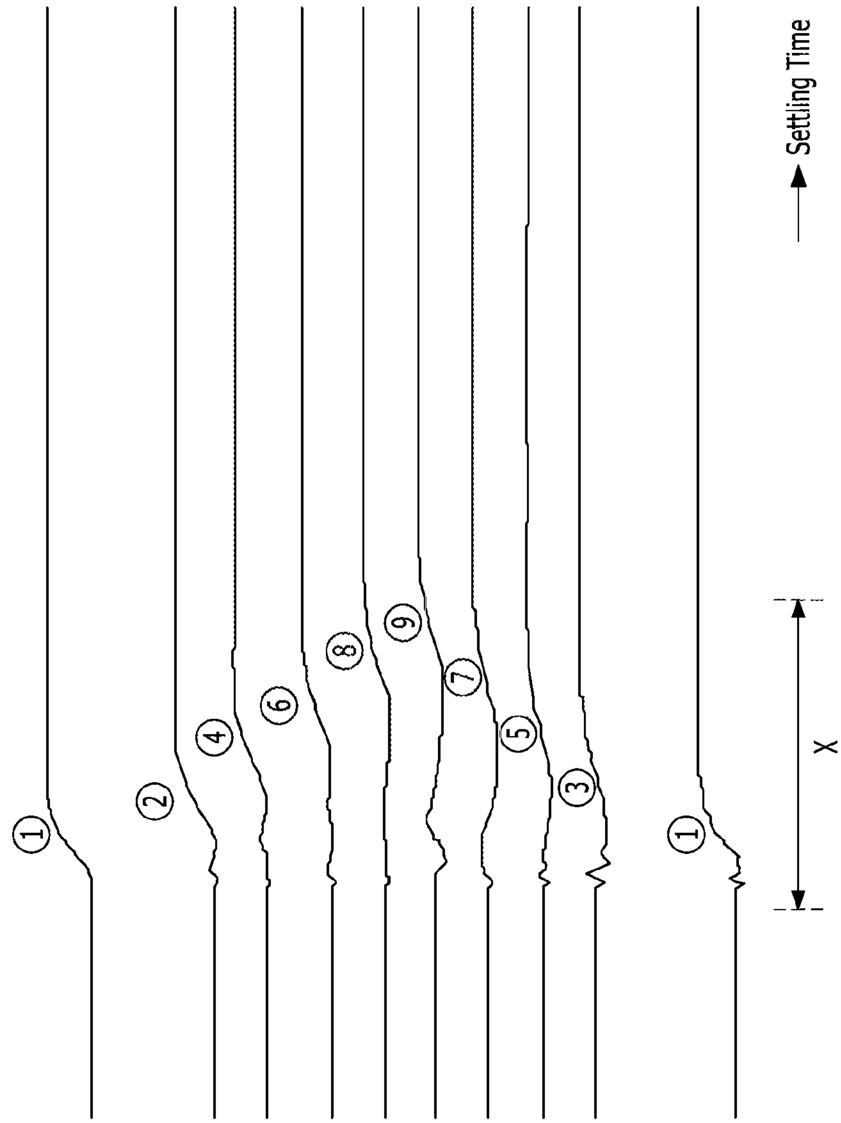
Figure 13:
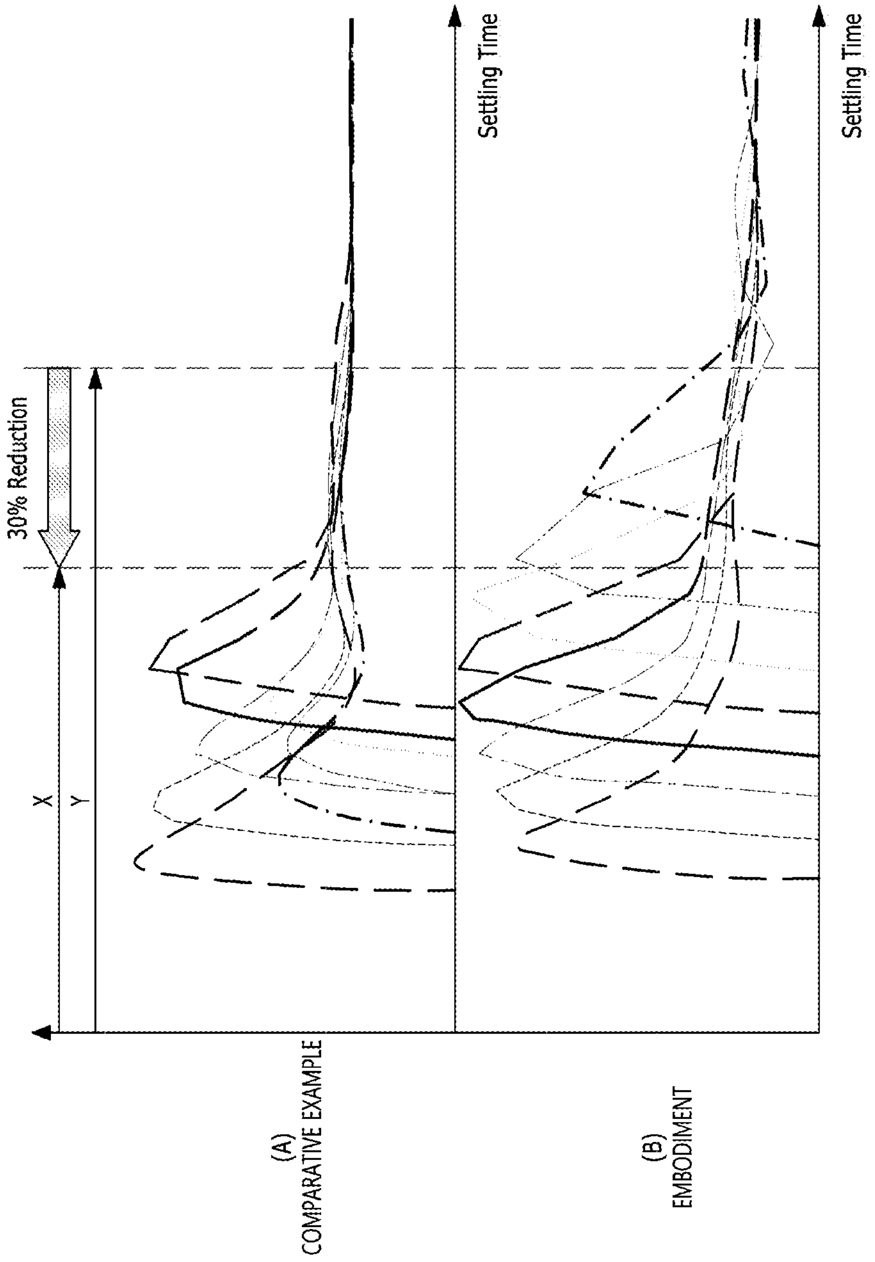
FIG. 13 is a diagram illustrating an example where an output settling time is more reduced in the first embodiment than the comparative example.

FIGS. 8 and 9 are diagrams illustrating a gamma voltage generating circuit 408-1 according to a first embodiment. FIG. 10 is a diagram illustrating a flow of an internal current when an internal resistance load is reduced, in the gamma voltage generating circuit 408-1 according to the first embodiment. FIGS. 11 and 12 are diagrams showing a gamma voltage determination order and an output settling time based thereon in the gamma voltage generating circuit 408-1 according to the first embodiment. FIG. 13 is a diagram illustrating an example where an output settling time is more reduced in the first embodiment than the comparative example.

Referring to FIGS. 8 and 9, comparing with the comparative example described above, the gamma voltage generating circuit 408-1 according to the first embodiment may have a largest difference in connection structure between a plurality of resistor strings R String 1 to 8.

Each of the plurality of resistor strings R String 1 to 8 may include a first connection portion coupled to a tap gamma output of a first gray level and a second connection portion coupled to a tap gamma output of a second gray level which is lower than the first gray level, and the second connection portions of the plurality of resistor strings R String 1 to 8 may be distributed and connected to output terminals of two or more gamma buffers.

Based on a connection configuration of the resistor strings R String 1 to 8, currents I1 to I8 flowing in the resistor strings R String 1 to 8 may not concentrate on an output terminal of one gamma buffer and may be distributed to output terminals of two or more gamma buffers as in FIG. 10.

Therefore, because load resistance levels of the resistor strings R String 1 to 8 decrease, even when levels of the currents I1 to I8 flowing in the resistor strings R String 1 to 8 increase, the increased currents I1 to I8 may not concentrate on only an output terminal of a lowermost gamma buffer GB0 and may be distributed to output terminals of the other gamma buffers, and thus, an abnormal operation of a gamma buffer caused by an overcurrent may be prevented.

The gamma voltage generating circuit 408-1 according to the first embodiment may decrease load resistance levels of the resistor strings R String 1 to 8 with no problem of an abnormal operation caused by an overcurrent, and thus, may not need to use a large-capacity gamma buffer which causes an increase in circuit size. On the other hand, because the load resistance levels of the resistor strings R String 1 to 8 are reduced, it may be possible to decrease a level of a gamma buffer. As a result, the gamma voltage generating circuit 408-1 according to the first embodiment may implement a fast response time in small-size products such as augmented reality (AR) or virtual reality (VR) requiring the use of a high resolution and a high frequency and may effectively improve the performance of a display apparatus.

Referring to FIGS. 8 and 9, the gamma voltage generating circuit 408-1 according to the first embodiment may include a plurality of tap nodes TAB0, TAB5, TAB10, TAB21, TAB40, TAB65, TAB99, TAB144, TAB190, and TAB255, a plurality of resistor strings R String 1 to 8 connected between two tap nodes, and a plurality of gamma buffers GB0, GB5, GB10, GB21, GB40, GB65, GB99, GB144, GB190, and GB255 which generate a plurality of tap gamma voltages VGAM[0], VGAM[5], VGAM[10], VGAM[21], VGAM[40], VGAM[65], VGAM[99], VGAM[144], VGAM[190], and VGAM[255] to output to the plurality of tap nodes, based on voltage division results of the plurality of resistor strings R String 1 to 8.

Some of the 0 to 255 gamma compensation voltages VGAM [0] to VGAM [255] may be a plurality of tap gamma voltages VGAM[0], VGAM[5], VGAM[10], VGAM[21], VGAM[40], VGAM[65], VGAM[99], VGAM[144], VGAM[190], and VGAM[255]. The number of tap gamma voltages VGAM[0], VGAM[5], VGAM[10], VGAM[21], VGAM[40], VGAM[65], VGAM[99], VGAM[144], VGAM[190], and VGAM[255] may be 10. A tap gamma voltage may be referred to as a gamma reference voltage.

Also, the other gamma compensation voltages except the tap gamma voltages may be voltages obtained through voltage division by a tap resistor RTAB connected between adjacent tap nodes TAB.

A first input voltage VIN255 may be buffered by an uppermost gamma buffer GB255 and may then be applied to an uppermost tap node TAB255, and thus, may be a tap gamma voltage VGAM [255] having a highest gray level. A second input voltage VIN0 may be buffered by a lowermost gamma buffer GB0 and may then be applied to a lowermost tap node TAB0, and thus, may be a tap gamma voltage VGAM [0] having a lowest gray level.

When a level of the first input voltage VIN255 and a level of the second input voltage VIN0 are shifted, levels of the 0 to 255 gamma compensation voltages VGAM [0] to VGAM [255] may be shifted.

A first resistor string R String 1 may include a first connection portion coupled to a tap gamma output VGAM [255] of a 255 gray level and a second connection portion coupled to a tap gamma output VGAM[0] of a 0 gray level. One of voltage division results of the first resistor string R String 1 may be a tap gamma output VGAM[190] of a 190 gray level and may be charged in the tap node TAB190 through a multiplexer MUX and a gamma buffer GB190.

A second resistor string R String 2 may include a first connection portion coupled to a tap gamma output VGAM [190] of a 190 gray level and a second connection portion coupled to the tap gamma output VGAM[0] of a 0 gray level. One of voltage division results of the first resistor string R String 2 may be a tap gamma output VGAM[5] of a 5 gray level and may be charged in the tap node TAB5 through the multiplexer MUX and a gamma buffer GB5.

A third resistor string R String 3 may include a first connection portion coupled to the tap gamma output VGAM [190] of a 190 gray level and a second connection portion coupled to the tap gamma output VGAM[5] of a 5 gray level. One of voltage division results of the third resistor string R String 3 may be a tap gamma output VGAM[144] of a 144 gray level and may be charged in the tap node TAB144 through the multiplexer MUX and a gamma buffer GB144.

A fourth resistor string R String 4 may include a first connection portion coupled to the tap gamma output VGAM [144] of a 144 gray level and a second connection portion coupled to the tap gamma output VGAM[5] of a 5 gray level. One of voltage division results of the fourth resistor string R String 4 may be a tap gamma output VGAM[10] of a 10 gray level and may be charged in the tap node TAB10 through the multiplexer MUX and a gamma buffer GB10.

A fifth resistor string R String 5 may include a first connection portion coupled to the tap gamma output VGAM [144] of a 144 gray level and a second connection portion coupled to the tap gamma output VGAM[10] of a 10 gray level. One of voltage division results of the fifth resistor string R String 5 may be a tap gamma output VGAM[99] of a 99 gray level and may be charged in the tap node TAB99 through the multiplexer MUX and a gamma buffer GB99.

A sixth resistor string R String 6 may include a first connection portion coupled to the tap gamma output VGAM [99] of a 99 gray level and a second connection portion coupled to the tap gamma output VGAM[10] of a 10 gray level. One of voltage division results of the sixth resistor string R String 6 may be a tap gamma output VGAM[21] of a 21 gray level and may be charged in the tap node TAB21 through the multiplexer MUX and a gamma buffer GB21.

A seventh resistor string R String 7 may include a first connection portion coupled to the tap gamma output VGAM [99] of a 99 gray level and a second connection portion coupled to the tap gamma output VGAM[21] of a 21 gray level. One of voltage division results of the seventh resistor string R String 7 may be a tap gamma output VGAM[65] of a 65 gray level and may be charged in the tap node TAB65 through the multiplexer MUX and a gamma buffer GB65.

An eighth resistor string R String 8 may include a first connection portion coupled to the tap gamma output VGAM [65] of a 65 gray level and a second connection portion coupled to the tap gamma output VGAM[21] of a 21 gray level. One of voltage division results of the eighth resistor string R String 8 may be a tap gamma output VGAM[40] of a 40 gray level and may be charged in the tap node TAB40 through the multiplexer MUX and a gamma buffer GB40.

The plurality of tap gamma voltages VGAM[0], VGAM [5], VGAM[10], VGAM[21], VGAM[40], VGAM[65], VGAM[99], VGAM[144], VGAM[190], and VGAM[255] may include a tap gamma voltage VGAM[255] of a highest gray level, a tap gamma voltage VGAM[0] of a lowest gray level, and tap gamma voltages VGAM[5], VGAM[10], VGAM[21], VGAM[40], VGAM[65], VGAM[99], VGAM [144], and VGAM[190] of the other gray levels between the highest gray level and the lowest gray level. Also, the tap gamma voltages VGAM[5], VGAM[10], VGAM[21], VGAM[40], VGAM[65], VGAM[99], VGAM[144], and VGAM[190] of the other gray levels may include a tap gamma voltage VGAM[190] of a second-high gray level, a tap gamma voltage VGAM[5] of a second-low gray level, and tap gamma voltages VGAM[10], VGAM[21], VGAM [40], VGAM[65], VGAM[99], and VGAM[144] of middle gray levels between the second-high gray level and the second-low gray level.

In this case, in a charging order of a plurality of tap gamma voltages on a plurality of tap nodes, as in FIG. 11, the tap gamma voltage VGAM[255] of a highest gray level and the tap gamma voltage VGAM[0] of a lowest gray level may be first in order, and at least one tap gamma voltage VGAM[40] of the tap gamma voltages VGAM[10], VGAM [21], VGAM[40], VGAM[65], VGAM[99], and VGAM [144] of middle gray levels may be latest in order.

Based on such a connection configuration, the number of resistor strings R String 1 to 8 may be equal to the number of tap gamma voltages VGAM[5], VGAM[10], VGAM[21], VGAM[40], VGAM[65], VGAM[99], VGAM[144], and VGAM[190] of the other gray levels. Also, an input terminal of each of the other gamma buffers GB5, GB10, GB21, GB40, GB65, GB99, GB144, and GB190 generating the tap gamma voltages VGAM[5], VGAM[10], VGAM[21], VGAM[40], VGAM[65], VGAM[99], VGAM[144], and VGAM[190] of the other gray levels may be connected to one resistor string through the multiplexer MUX.

Currents I1 to I8 flowing in the plurality of resistor strings R String 1 to 8 may not concentrate on an output terminal of one gamma buffer and may be distributed to output terminals of two or more gamma buffers as in FIG. 10. For example, when it is assumed that the currents I1 to I8 flow in the plurality of resistor strings R String 1 to 8, "I1+I2" may flow in an output terminal of the gamma buffer GB0, "I3+I4" may flow in an output terminal of the gamma buffer GB5, "I5+I6" may flow in an output terminal of the gamma buffer GB10, and "I7+I8" may flow in an output terminal of the gamma buffer GB21.

As described above, because load resistance levels of the resistor strings R String 1 to 8 decrease, even when levels of the currents I1 to I8 flowing in the resistor strings R String 1 to 8 increase, the increased currents I1 to I8 may not concentrate on only the output terminal of the lowermost gamma buffer GB0 and may be distributed to the output terminals of the other gamma buffers, and thus, an abnormal operation of a gamma buffer caused by an overcurrent may be prevented. For example, in the gamma voltage generating circuit according to the first embodiment, tap gamma voltages may be charged in tap nodes in the order of ①_②_③_. . ._⑧_⑨ as in FIGS. 11 and 12. Because a charging order of tap gamma voltages is determined in a zigzag form as a voltage of an upper end to a voltage of a lower end are alternately provided, an output settling time X of the gamma voltage generating circuit may be reduced.

Referring to FIG. 13, it may be seen that an output settling time X according to the first embodiment decreases by about 30% compared to an output settling time Y of the comparative example.

Figure 14:
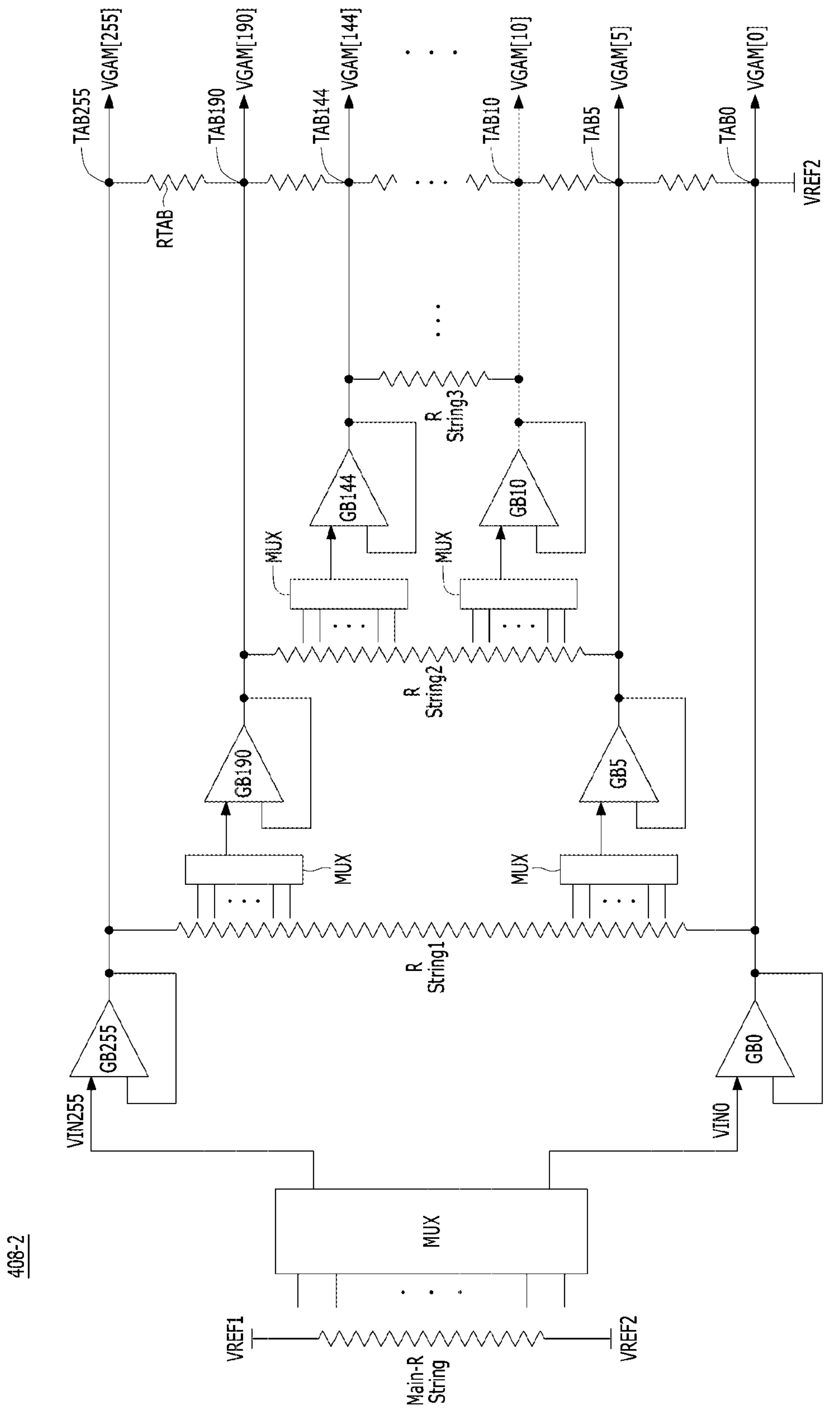
FIG. 14 is a diagram illustrating a gamma voltage generating circuit according to a second embodiment.

FIG. 14 is a diagram illustrating a gamma voltage generating circuit 408-2 according to a second embodiment.

Referring to FIG. 14, the gamma voltage generating circuit 408-2 according to the second embodiment may more easily decrease a circuit size than the gamma voltage generating circuit 408-1 according to the first embodiment. In the gamma voltage generating circuit 408-2 according to the second embodiment, two gamma buffers may be connected to one resistor string in common, for circuit miniaturization.

In the gamma voltage generating circuit 408-2 according to the second embodiment, the number of resistor strings R String 1 to 4 may be less than the number of tap gamma voltages VGAM[5], VGAM[10], VGAM[21], VGAM[40], VGAM[65], VGAM[99], VGAM[144], and VGAM[190] of the other gray levels.

In the other gamma buffers GB5, GB10, GB21, GB40, GB65, GB99, GB144, and GB190, gamma buffers GB5 and GB190 may be connected to a first resistor string R String 1 in common, and gamma buffers GB10 and GB144 may be connected to a second resistor string R String 2 through multiplexers MUX in common.

Moreover, the gamma voltage generating circuit 408-2 according to the second embodiment may include all fundamental elements of the gamma voltage generating circuit 408-1 according to the first embodiment, thereby realizing all technical effects of the gamma voltage generating circuit 408-1 according to the first embodiment.

Figure 15:
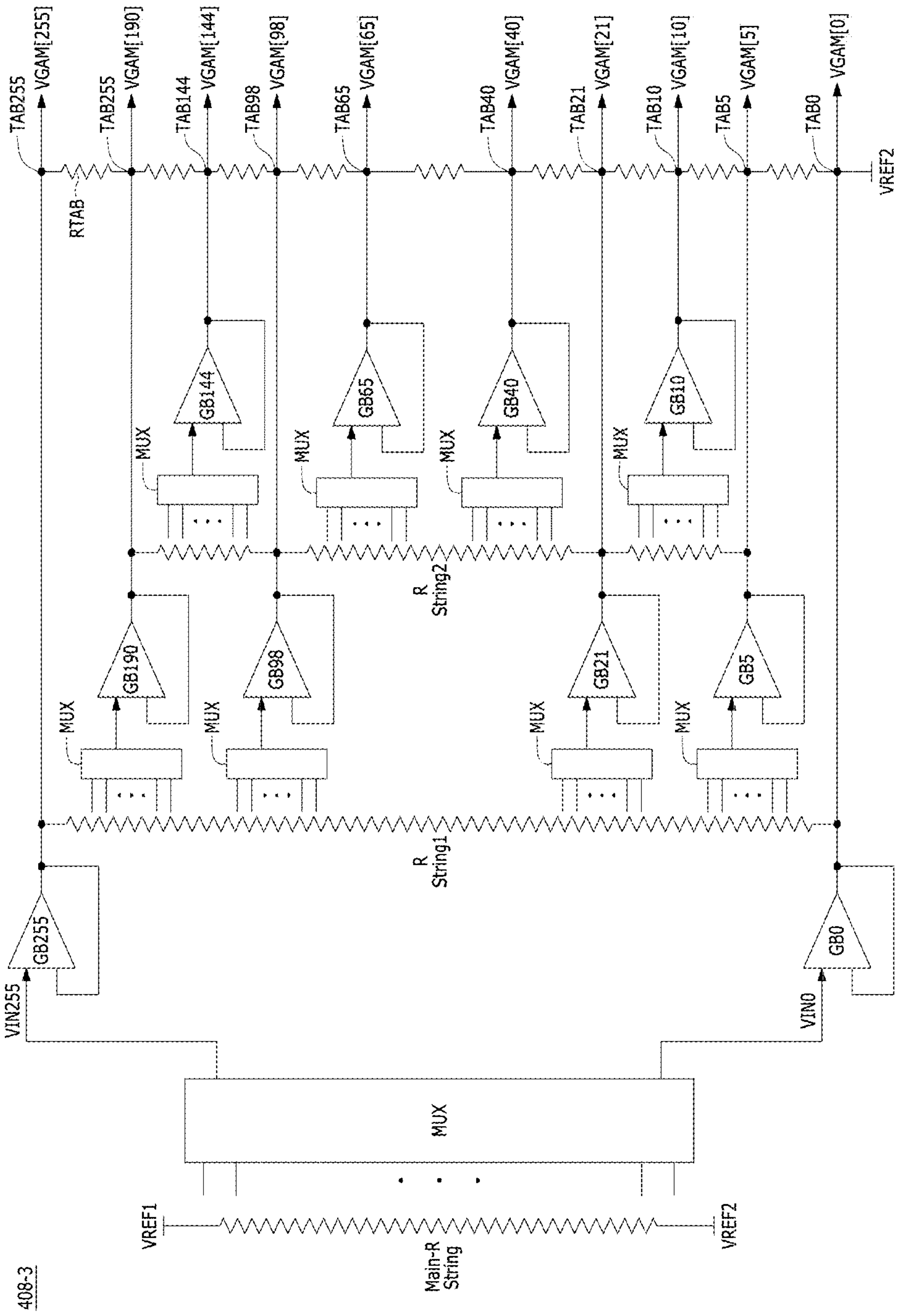
FIG. 15 is a diagram illustrating a gamma voltage generating circuit according to a third embodiment.

FIG. 15 is a diagram illustrating a gamma voltage generating circuit 408-3 according to a third embodiment.

Referring to FIG. 15, the gamma voltage generating circuit 408-3 according to the third embodiment may more easily decrease a circuit size than the gamma voltage generating circuit 408-1 according to the first embodiment. In the gamma voltage generating circuit 408-3 according to the third embodiment, four gamma buffers may be connected to one resistor string in common, for circuit miniaturization.

In the gamma voltage generating circuit 408-3 according to the third embodiment, the number of resistor strings R String 1 and 2 may be less than the number of tap gamma voltages VGAM[5], VGAM[10], VGAM[21], VGAM[40], VGAM[65], VGAM[99], VGAM[144], and VGAM[190] of the other gray levels.

In the other gamma buffers GB5, GB10, GB21, GB40, GB65, GB99, GB144, and GB190, gamma buffers GB5, GB21, GB98, and GB190 may be connected to a first resistor string R String 1 in common, and gamma buffers GB10, GB40, GB65, and GB144 may be connected to a second resistor string R String 2 through multiplexers MUX in common.

Moreover, the gamma voltage generating circuit 408-3 according to the third embodiment may include all fundamental elements of the gamma voltage generating circuit 408-1 according to the first embodiment, thereby realizing all technical effects of the gamma voltage generating circuit 408-1 according to the first embodiment.

Figure 16:
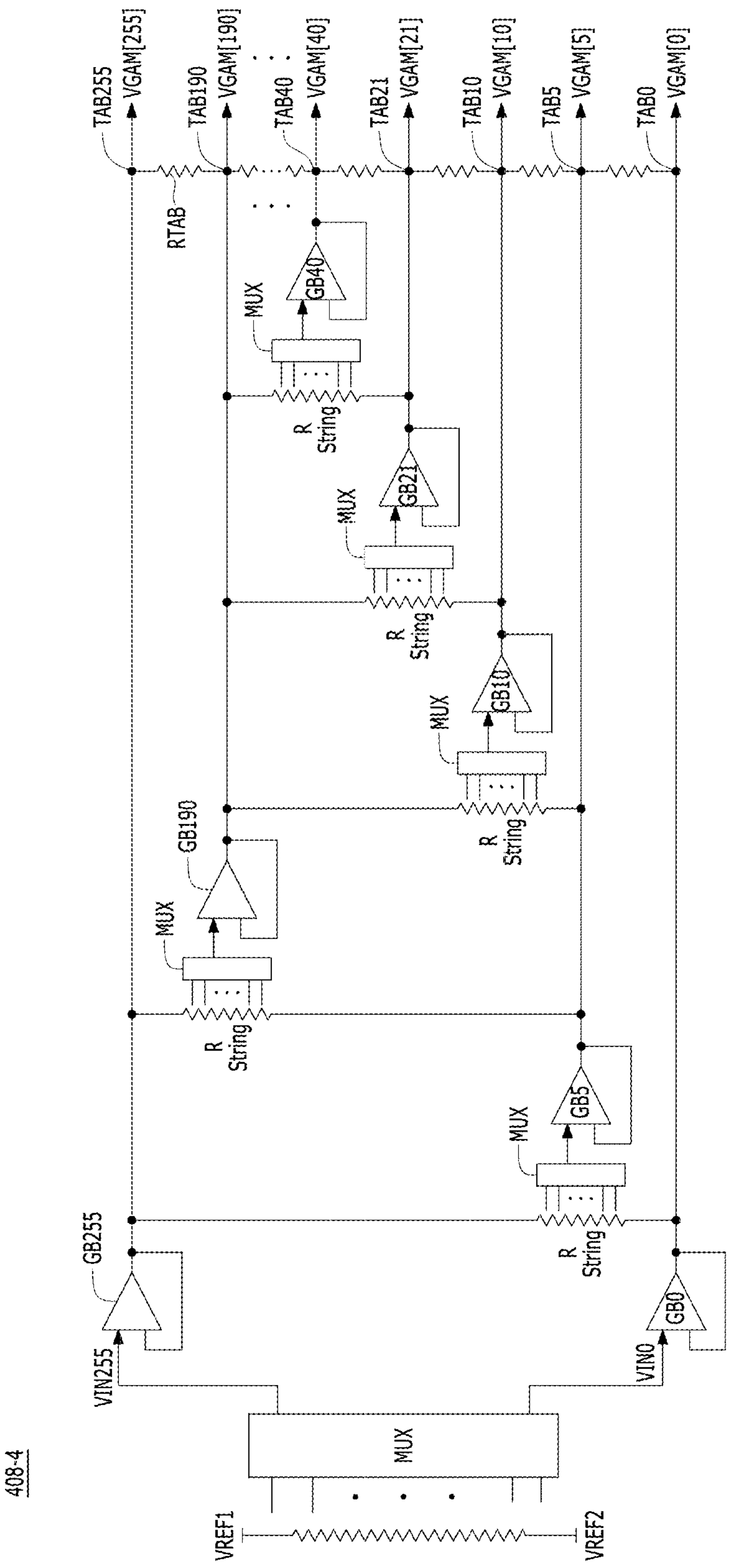
FIG. 16 is a diagram illustrating a gamma voltage generating circuit according to a fourth embodiment.

FIG. 16 is a diagram illustrating a gamma voltage generating circuit 408-4 according to a fourth embodiment.

Referring to FIG. 16, comparing with the gamma voltage generating circuit 408-1 according to the first embodiment, the gamma voltage generating circuit 408-4 according to the fourth embodiment may have a large difference in connection configuration between resistor strings R String. The gamma voltage generating circuit 408-4 according to the fourth embodiment may be implemented by modifying a connection arrangement structure of gamma buffers, based on a grayscale period requiring detailed adjustment.

Moreover, the gamma voltage generating circuit 408-4 according to the fourth embodiment may include all fundamental elements of the gamma voltage generating circuit 408-1 according to the first embodiment, thereby realizing all technical effects of the gamma voltage generating circuit 408-1 according to the first embodiment.

The present embodiment may realize the following effect.

The gamma voltage generating circuit according to the present disclosure may implement a fast response time with no problem of an abnormal operation caused by an overcurrent even without an increase in size of a gamma buffer.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A gamma voltage generating circuit, comprising:

a plurality of tap nodes;

a plurality of resistor strings connected between two tap nodes of the plurality of tap nodes; and a plurality of gamma buffers configured to generate a plurality of tap gamma voltages to output to the plurality of tap nodes, based on voltage division results by the plurality of resistor strings, wherein each of the plurality of resistor strings comprises a first connection portion coupled to a tap gamma output of a first gray level and a second connection portion coupled to a tap gamma output of a second gray level which is lower than the first gray level, and wherein the second connection portions of the plurality of resistor strings are distributed and connected to output terminals of two or more gamma buffers.

2. The gamma voltage generating circuit of claim 1, wherein the plurality of tap gamma voltages comprises a tap gamma voltage of a highest gray level, a tap gamma voltage of a lowest gray level, and tap gamma voltages of other gray levels between the highest gray level and the lowest gray level, wherein the tap gamma voltages of the other gray levels comprise a tap gamma voltage of a second-high gray level, a tap gamma voltage of a second-low gray level, and tap gamma voltages of middle gray levels between the second-high gray level and the second-low gray level, and wherein, in a charging order of the plurality of tap gamma voltages on the plurality of tap nodes, the tap gamma voltage of the highest gray level and the tap gamma voltage of the lowest gray level are first in order, and at least one of the tap gamma voltages of the middle gray levels is latest in order.

3. The gamma voltage generating circuit of claim 2, wherein a number of resistor strings is equal to a number of tap gamma voltages of the other gray levels.

4. The gamma voltage generating circuit of claim 3, wherein an input terminal of each of a plurality of other gamma buffers generating the tap gamma voltages of the other gray levels is connected to one resistor string through a multiplexer.

5. The gamma voltage generating circuit of claim 2, wherein a number of resistor strings is less than a number of tap gamma voltages of the other gray levels.

6. The gamma voltage generating circuit of claim 5, wherein a plurality of other gamma buffers generating the tap gamma voltages of the other gray levels is connected to one resistor string through multiplexers in common.

7. The gamma voltage generating circuit of claim 1, wherein currents flowing in the plurality of resistor strings do not concentrate on an output terminal of one gamma buffer and are distributed to output terminals of the two or more gamma buffers.

8. A display apparatus, comprising:

a display panel including a plurality of pixels;

a gamma voltage generating circuit configured to output gamma compensation voltages including a plurality of tap gamma voltages; and a digital-to-analog converter configured to map input image data to the gamma compensation voltages to output data voltages which are to be input to the plurality of pixels, wherein the gamma voltage generating circuit comprises:

a plurality of tap nodes;

a plurality of resistor strings connected between two tap nodes of the plurality of tap nodes; and a plurality of gamma buffers configured to generate a plurality of tap gamma voltages to output to the plurality of tap nodes, based on voltage division results of the plurality of resistor strings, wherein each of the plurality of resistor strings comprises a first connection portion coupled to a tap gamma output of a first gray level and a second connection portion coupled to a tap gamma output of a second gray level which is lower than the first gray level, and wherein the second connection portions of the plurality of resistor strings are distributed and connected to output terminals of two or more gamma buffers.

9. The display apparatus of claim 8, wherein the plurality of tap gamma voltages comprises a tap gamma voltage of a highest gray level, a tap gamma voltage of a lowest gray level, and tap gamma voltages of other gray levels between the highest gray level and the lowest gray level, wherein the tap gamma voltages of the other gray levels comprise a tap gamma voltage of a second-high gray level, a tap gamma voltage of a second-low gray level, and tap gamma voltages of middle gray levels between the second-high gray level and the second-low gray level, and wherein, in a charging order of the plurality of tap gamma voltages on the plurality of tap nodes, the tap gamma voltage of the highest gray level and the tap gamma voltage of the lowest gray level are first in order, and at least one of the tap gamma voltages of the middle gray levels is latest in order.

10. The display apparatus of claim 9, wherein a number of resistor strings is equal to a number of tap gamma voltages of the other gray levels.

11. The display apparatus of claim 10, wherein an input terminal of each of a plurality of other gamma buffers generating the tap gamma voltages of the other gray levels is connected to one resistor string through a multiplexer.

12. The display apparatus of claim 9, wherein a number of resistor strings is less than a number of tap gamma voltages of the other gray levels.

13. The display apparatus of claim 12, wherein a plurality of other gamma buffers generating the tap gamma voltages of the other gray levels is connected to one resistor string through multiplexers in common.

14. The display apparatus of claim 8, wherein currents flowing in the plurality of resistor strings do not concentrate on an output terminal of one gamma buffer and are distributed to output terminals of the two or more gamma buffers.

* * * * *